Jan. 23, 1951 P. C. EFROMSON ET AL 2,538,954
NONDIRECTIONAL ISOLATOR UNIT
Filed Dec. 12, 1945 4 Sheets-Sheet 1

Inventors
Philip C. Efromson
John A. Dickie
Robert C. Lewis
By their Attorneys
Howson and Howson Jan. 23, 1951  P. C. EFROMSON ET AL  2,538,954
NONDIRECTIONAL ISOLATOR UNIT
Filed Dec. 12, 1945  4 Sheets-Sheet 2

Inventors
Philip C. Efromson
John A. Dickie
Robert C. Lewis
By their Attorneys
Howson and Howson Jan. 23, 1951

P. C. EFROMSON ET AL

2,538,954

NONDIRECTIONAL ISOLATOR UNIT

Filed Dec. 12, 1945

Inventors
Philip C. Efromson
John A. Dickie
Robert C. Lewis
By their Attorneys
Howson and Howson Patented Jan. 23, 1951

2,538,954

UNITED STATES PATENT OFFICE 2,538,954

NONDIRECTIONAL ISOLATOR UNIT

Philip C. Efromson, John A. Dickie, and Robert C. Lewis, New Haven, Conn., assignors to The M. B. Manufacturing Company, Inc., New Haven, Conn., a corporation of Connecticut Application December 12, 1945, Serial No. 634,461

12 Claims. (Cl. 248—358)

This invention relates to means for mounting vibrating bodies so as to prevent transmission of the vibrations from the vibrating body to the supporting means for the body. In the mounting of vibrating bodies a plurality of isolating units having a cushion member of resilient material have often been used, but such units have had very different degrees of stiffness along their three major axes. The major axes are three mutually perpendicular dimensions. In order to determine the proper locations for the units with respect to the body being supported, it has heretofore been necessary to orient the axes of each unit with respect to the axes of the supported body and to consider the effects of the stiffness of the isolator unit along each of these axes independently in all of the calculations. The necessity for renewed calculations for each change in position of application or in the orientation of the isolator unit at the point of application made the calculations of such complexity that for many applications such analysis is seldom made.

According to this invention we provide an isolator unit for the mounting of vibrating bodies such that its stiffness is substantially the same along its three major axes. When the points of application of such units has been determined, the manner of their application to both the supported and supporting bodies is without effect upon the efficiency of the isolator unit. Thus the units work equally well at any mounting angle, each isolator having substantially equal spring rates in all directions. Thus each unit is nondirectional.

In the drawings in which there are illustrated isolator units made in accordance with this invention and applications of such units to an internal combustion engine in a variety of ways:

Figs. 7 and 8 are partial views in front and side elevation, respectively, showing a modified form of application of the isolator unit of Figs. 1 and 2 to the mounting of the front end of an internal combustion engine in an automobile chassis;

Fig. 14 is a side elevational view, partly in section, and Fig. 15 is an end elevational view of the application of the isolator unit of Figs. 3 and 4 to the mounting of an internal combustion engine;

Fig. 17 is a diagrammatic view indicating the sections of the rubber used in calculating the spring rates of one of the elements of the unit shown in Figs. 3 and 4.

A rigid body in space is considered as having six degrees or kinds of freedom of motion. All movements of the body will be one or more of these modes of motion or a combination of them. These six modes are translation along each of three mutually perpendicular axes, and rotation about each of these three axes. It is well known that to isolate a vibrating body it is desirable to use isolators which give the body a natural frequency of vibration in each mode of motion which is considerably below the frequency to which the body is exposed. In order to allow all modes of motion to have comparably low frequencies, it is desirable to have a unit which provides a comparable amount of flexibility and stability in all directions. We have also discovered that it is generally possible to design a suspension providing for essentially decoupled conditions except for interaction between translation and rotation in each of two perpendicular planes, and further that with these conditions existing that the use of isolator units having equal stiffnesses in all directions allows design of superior suspensions, in that the ratio of the highest frequency of motion to the lowest frequency of motion can be made a minimum. This gives the requisite isolation for all modes without loss of stability in any mode, and minimizes the chances of resonance occurring.

Our invention envisages an isolator unit having equal spring rates in all directions, i. e., a non-directional unit. Heretofore all isolator units have been designed for a particular installation or the installation has been designed for the available isolator units in cases where the efficiency of isolation has had any consideration at all, and the unit has been oriented with its major axis in a particular relation to the load. It has been believed that only in this way could the maximum efficiency be obtained. We have discovered that the results obtained so laboriously by the directional mounting units of the prior art can be equalled in an extremely simple manner by our non-directional units. All our units have equal spring rates in three certain directions when the rates are calculated as hereinafter described, those three directions being three major dimensions which are mutually perpendicular. According to our construction the spring rates are not only substantially equal for the major part of the operating range, but they are also substantially constant, i. e., linear.

It is well to bear in mind that due to the difference in cushioning effects of rubber in shear and compression, the ratio of stiffnesses in a radial direction in a tubular mount unit to the axial stiffness is never less than 4 and may run as high as 15 in units of practical design. On the other hand, in a sandwich mount unit the same ratio is never more than 0.25. We have discovered that by the use of certain formulae which we have made, it is possible to get a combination of the tubular and sandwich mount which has a ratio of stiffnesses in any two of the three principal directions which is equal to unity, and that this ratio gives unexpected advantages and desirable characteristics. Two examples of such non-directional mounts will be described—the unit shown in Figs. 1 and 2 which we term the "shouldered tube" type and the unit shown in Figs. 3 and 4 which we term the "cone" type. In both cases the resilient member can be considered as a hollow body of revolution. Resilient means according to our invention can be considered as lying within the space defined by a hollow body of revolution.

Figures 1, 2, 10, 11, 16:
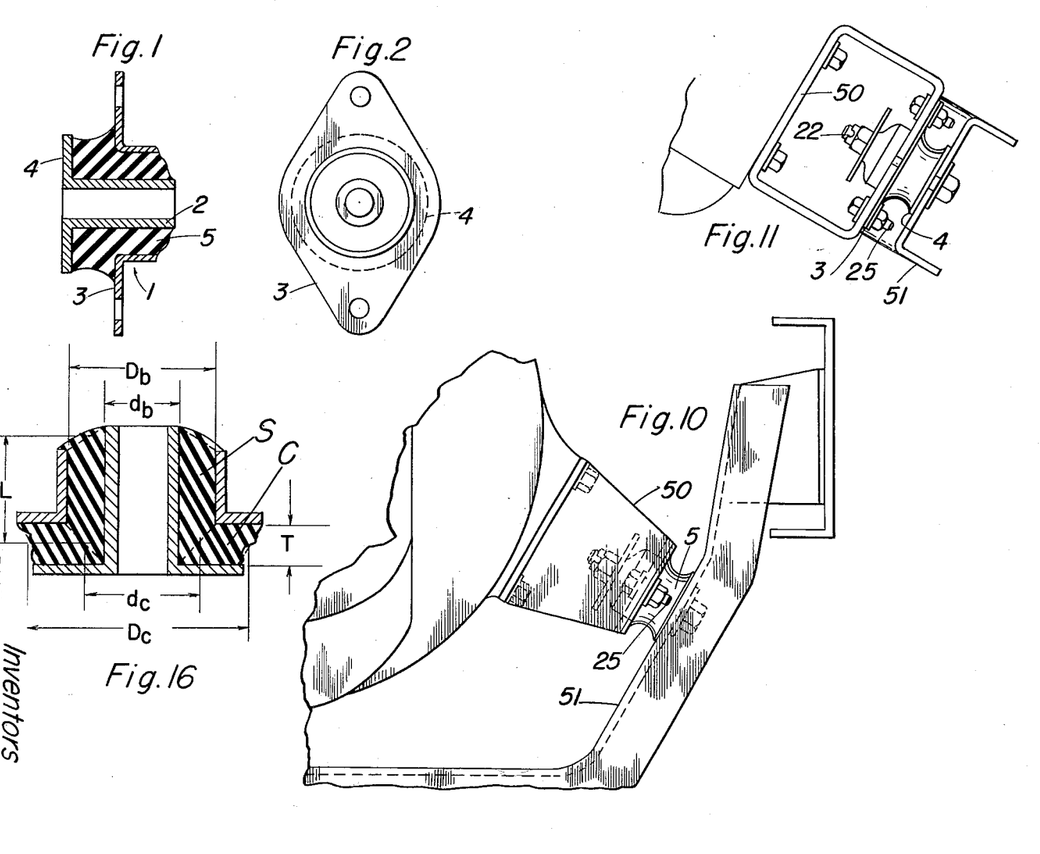
Fig. 1 is a central longitudinal section of an isolator unit of a shouldered tube type made in accordance with this invention.
Fig. 2 is a top plan view of the isolator unit of Fig. 1.
Figs. 10 and 11 are partial views in elevation and plan, respectively, of a further modification of the application of the isolator unit of Figs. 1 and 2 to the mounting of an internal combustion engine, the unit being shown as applied at the rear end of the engine.
Fig. 16 is a sectional view of an isolator unit of the construction shown in Figs. 1 and 2 marked to indicate the dimensions of the sections of the rubber used in calculating the spring rates of the unit.

The isolator unit as shown in Figs. 1 and 2 comprises in general, outer flanged tube 1 of metal or other material substantially rigid and suitable for structural use, an inner flanged tube 2 of similar material, relatively longer and smaller in diameter than tube 1, and with its flange 4 disposed at the same end as the flange 3 of the tube 2, and an intermediate flanged tube or member 5 of elastic resilient material with relatively thicker wall and flange than the tubes 1 and 2, the elastic member 5 being so shaped as to substantially fill the space between the tubes 1 and 2, and the parts being assembled either with or without bonding or mechanical adhesion of the elastic member 5 to the tubes 1 and 2 and their respective flanges.

The elastic member 5 is arranged relatively to the members 1 and 2 so as to make the compressive strength of the elastic member available to carry the major part of the loads applied to the unit in any direction, thus permitting of a material saving in the amount of the elastic material required. The elastic member 5 is arranged so as to provide a uniform load-deflection or spring rate between the outer and inner members regardless of the direction of application of load across the unit thus permitting complete freedom in the application of the unit to a specific installation inasmuch as the direction or position of the unit does not affect the efficiency of the unit in the isolation of vibration. As the unit has a uniform load-deflection rate in all directions, specially shaped attaching brackets to hold the unit in a particular space orientation are not required. The unit may be turned in space to adapt available attachment means most effectively to the structure thus, in many cases, eliminating weight, bulk and costly fabrication of parts and with no effect on the dynamic properties of the mounting provided by the units. Further by properly positioning the units in supporting an object as efficient suppression of vibration may be secured as with directional isolator units specially designed for use with the specific object. The shape and extent of the members 1 and 2 which enclose the elastic member 5 cause the unit to retain its ability to carry load and to maintain approximately its original spring rate even after partial failure of the elastic member by cracking or splitting.

Figure 3:
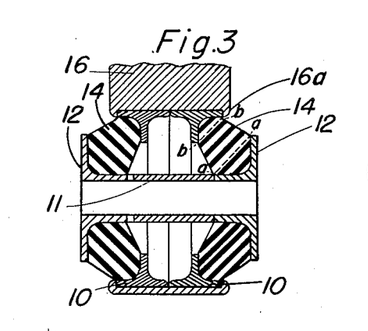
Fig. 3 is a view similar to Fig. 1 of an isolator unit made in accordance with this invention but of a conical type.

In Figs. 5 to 13, inclusive of the drawings, the shouldered tube isolator unit of Figs. 1 and 2 is shown supporting the engine of an automobile, being applied in various ways at the front and rear supporting points of the engine. In Figs. 14 and 15 the cone type isolator unit of Figs. 3 and 4 is shown applied, it being understood that the mounting of the unit of Figs. 3 and 4 can be varied as is the mounting of the unit of Figs. 1 and 2.

Figure 5:
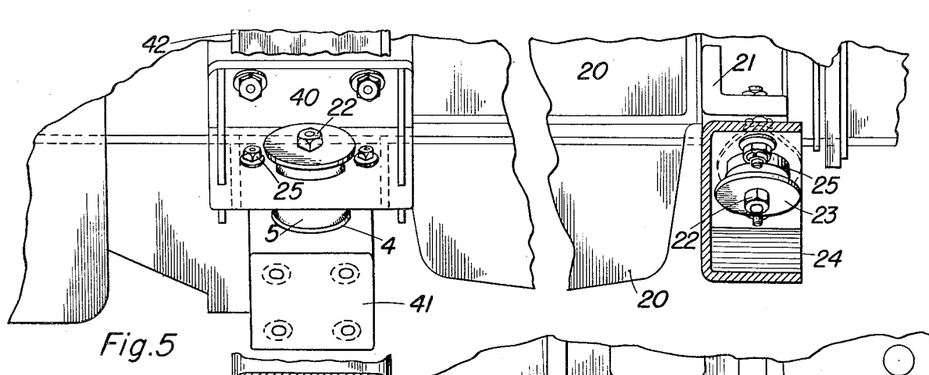
Fig. 5 is a partial broken view in side elevation showing the application of isolator units as shown in Figs. 1 and 2 to the mounting of an internal combustion engine in an automobile chassis.
Figure 6:
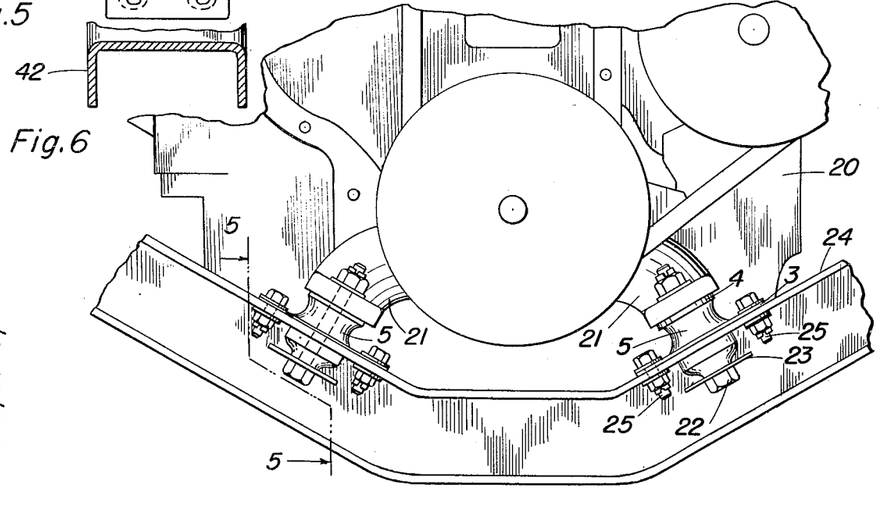
Fig. 6 is a view in elevation, looking from the right in Fig. 5 and showing the application of the isolator units at the front end of the engine shown in Fig. 5.

In the application of the isolator unit of Figs. 1 and 2 at the front end of the engine as shown in Figs. 5 and 6, the engine 20 is provided with attaching brackets 21 at opposite sides of the engine. Bolts 22 extending through the openings in the inner tubes 2 of the units and bearing against washers 23 secure the flanges 4 of the members 2 to the brackets 21. The isolator units project through openings in the upper flange of a channel cross-member 24 of the car chassis and are secured to the upper flange by bolts 25 extending through openings in the flange of channel member 24 and the flanges 3 of the outer tubular members 1 of the units. The brackets 21 and the portions of the channel member 24 to which the units are attached are shown inclined so that the center lines of the bolts 22 intersect.

Figures 7, 8, 14, 15, 17:
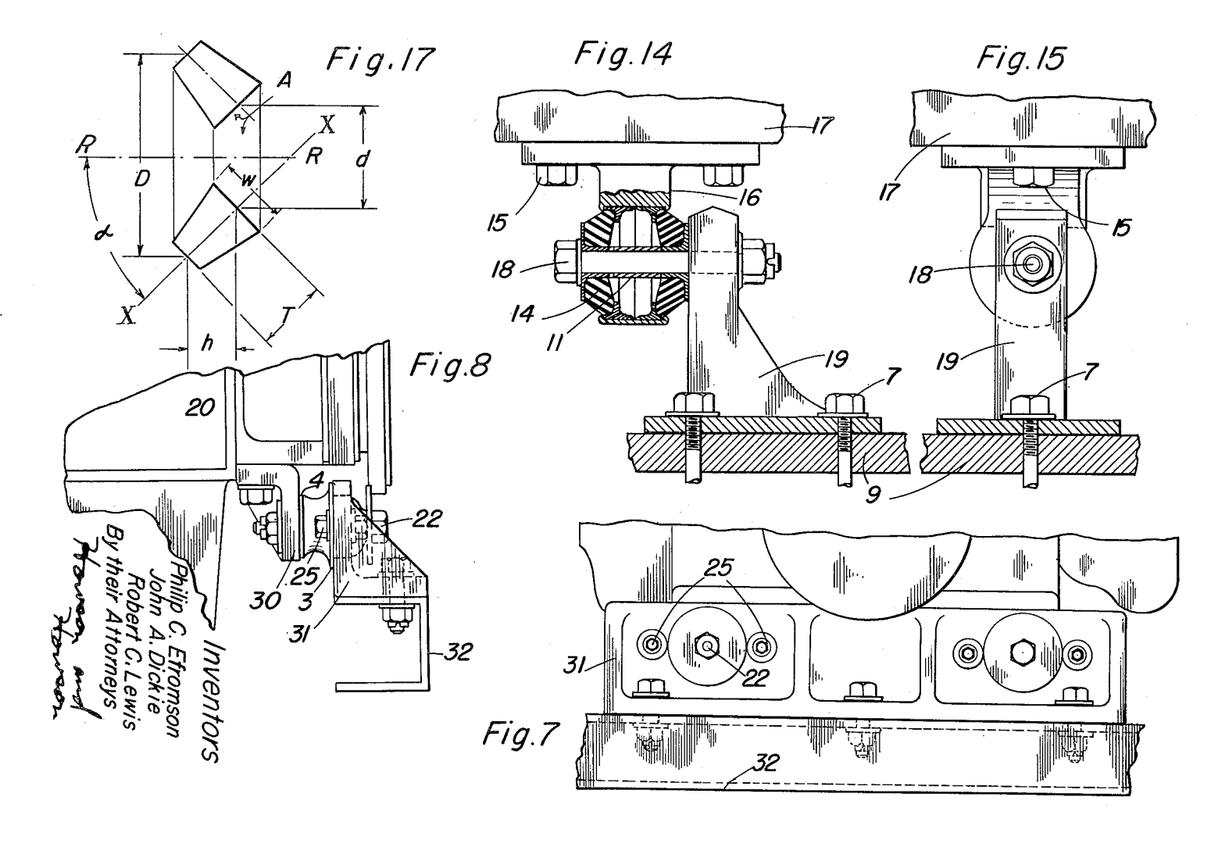

In the application of the isolator unit in the manner shown in Figs. 7 and 8 the units are mounted between parallel transversely extending brackets 30 and 31 secured to the front of the engine 20 and to a cross-member 32 of the car frame, respectively. In this application, the flanges 3 of the outer members 1 are secured to the bracket 31 by bolts 25 while the flange 4 of the inner member 2 is secured against the bracket 30 by the bolt 22 extending through the member 2 and the bracket. In this application the units project through openings in the brackets 31 and are arranged with their axes parallel to each other and at right angles to the application of the load to the units.

Figures 4, 9:
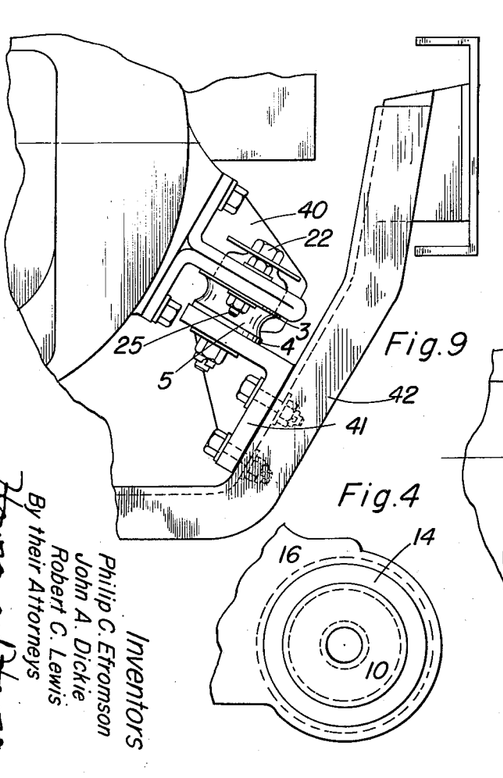
Fig. 4 is an end view of the unit of Fig. 3.
Fig. 9 is a partial view in elevation looking from the left in Fig. 5 and showing the application of the isolator unit of Figs. 1 and 2 to the mounting of the rear end of the internal combustion engine in Fig. 5.

In the application of the isolator unit at the rear end of the engine as shown in Figs. 9 and 5, brackets 40 are attached to the sides of the engine crank case, adjacent the rear thereof, and brackets 41 are attached to the cross-member 42 of the car frame. The vibration isolator units are placed between substantially parallel portions of the cooperating brackets with the flange 3 of the outer member 1 of the unit attached to the underside of the bracket 40 by the bolts 25 while the bolt 22 secures the flange 4 of the inner member 2 of the unit to the upper face of the bracket 41. The portions of the brackets to which the units are secured are inclined to a horizontal plane so that the axes of the units diverge upwardly and the angle at which the load is applied to the units differs from that of the constructions previously described.

In the application of the isolator unit as shown in Figs. 10 and 11 brackets 50 are attached to opposite sides of the engine crank case adjacent the rear end thereof and the vibration isolator units are mounted between inclined portions of a channel-shaped car frame cross member 51 and correspondingly inclined portions of the brackets 50, the flanges 3 of the outer members 1 being held against the outer faces of the bracket portions by bolts 25 while the flanges 4 of the inner members 2 bear against the web of the cross member and are secured in position by the bolts 22. The units project through the portions of the brackets 50 to which they are attached and are inclined inwardly with the center line of the bolts 22 intersecting in the central vertical longitudinal plane of the motor.

Figure 12:
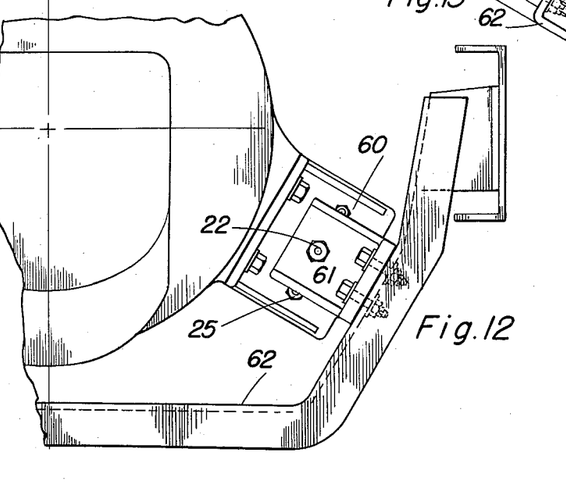
Figs. 12 and 13 are views similar to Figs. 10 and 11, respectively of a further modification of the application of the same isolator unit to the rear end of the engine.
Figure 13:
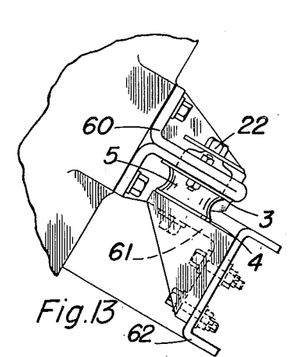

In the application of the isolator unit as shown in Figs. 12 and 13 brackets 60 are attached to opposite sides of the engine crank case adjacent the rear end thereof and brackets 61 are attached to inclined portions of a channel-shaped car frame cross member 62. The brackets 60 and 61 are similar to the brackets 40, 41, respectively, of Fig. 9, but are mounted with their attaching portions for the units turned through an angle of 90° with respect to the corresponding brackets of Fig. 9. As thus positioned, the brackets provide parallel vertical surfaces between which the units are mounted, the units projecting through the brackets 60 and having the flanges 3 of the outer members 1 secured thereto by bolts 25 while the flanges 4 of the inner members 2 are held against the brackets 61 by the bolts 22, securing the units with the axes of the bolts 22 extending parallel in a horizontal plane.

For suitable loads the isolator units may also be constructed as shown in Figs. 3 and 4 of a plurality of oppositely-disposed elements each of which is designed to have the same spring rate or stiffness in each of three mutually perpendicular axes. As shown in Figs. 3 and 4, each element consists of two annular members 10 and 12 connected by rubber or other resilient material 14, either bonded to the annular members or unbonded. The outer annular member 10 has a T-shaped cross section, one leg being parallel to the axis of revolution and the other leg turned inward toward the axis of revolution. The inner annular member 12 has an angular cross-section, one leg of the angle being parallel to the axis of revolution and the other leg directed outwardly from that axis and the member 12 is so proportioned relatively to the member 10 that the cross-sectional areas of the rubber between the outer edges of the angles formed by the members 10 and 12, as on the dashed lines a—a and b—b, are substantially equal. Where a plurality of the elements are combined in a unit as in Figs. 3 and 4, the outer annular members 10 are placed with their free legs abutting, the legs being proportioned to provide the desired spacing of the elements or suitable spacing rings being inserted between the adjacent free legs. The elements may be secured together by a suitable ring or bracket 16 having edges 16a spun over the outer edges of the outer members 10. A spacing tube 11 is placed between the inner edges of the inner members 12 and serves to receive a securing bolt. In the free condition of the elements the tube 11 is slightly less in length than the distance between the members 12 so that when the bolt is tightened in securing the unit in position, the tube 11 limits the inward movement of the members 12 and the initial strain to which the elements 14 are subjected. The bracket 16 may be secured to a support or the object 17 to be supported by bolts 15 as shown in Figs. 14 and 15 and secured by a bolt 18 extending through the members 12 and tube 11 to a bracket 19 secured by bolts 7 to a support or supported member 9. The unit, being formed of elements having the same spring rate or stiffness in each of three mutually perpendicular axes will likewise have the same spring rates in any direction and the mounting of this unit may be varied as shown in connection with the unit of Figs. 1 and 2.

In order to provide a non-directional vibration isolator in accordance with this invention it is necessary that the unit have substantially the same spring rate or stiffness along each of three mutually perpendicular axes and this is accomplished by providing rubber which is placed in shear and rubber which is subjected to compression by the forces to which the unit is subjected. The stiffness of a simple element in compression always exceeds its shear stiffness by a considerable factor and the bonded rubber bushing or hollow cylinder is always several times stiffer in radial than axial deformation. The combination of a simple compression rubber element and a hollow rubber cylinder or bushing in such a manner that the stiff radial spring rate of the bushing co-operates with the relatively low shear rate of the compression element and the low axial shear rate of the bushing cooperates with the high compressive stiffness of the compression element, provides a means by which the same spring rate or stiffness can be provided on the three mutually perpendicular axes. We have termed shear, compression and tension as manners of stress or deflection. Shear, compression and tension can also be considered as relations of rigid members and rubber.

Such combinations are considered as complex forms in ascertaining the specific dimensions necessary to give an isolator unit which has non-directional properties. When the desired shape of resilient member may be considered complex, the stiffnesses of the various parts or elements of the member should be calculated first, and then these elemental stiffnesses of the basic elements are added according to their arrangement in the complex, i. e., complete structure. This gives the net stiffnesses which must be equal. Let us first decide what basic elements or parts comprise the shouldered tube form of isolator unit shown in Figs. 1 and 2. The rubber member 5, as shown in Fig. 16, divides itself into a simple cylindrical compression element C and a bushing S. We will first explain how the stiffness in compression and the stiffness in shear of the compression element C are ascertained. The compression stiffness in the case of compression element C is in the axial direction, and the stiffness in shear is in the radial direction. We have ascertained that the stiffness of a unit or element in compression, expressed in pounds per square inch ($K_c$) is obtained by the following formula:

$$K_c = \frac{A}{T}(10)^{\left[1.82 + .015H + 0.52\frac{(A)}{(a)}\right]}$$

The corresponding novel formula for the stiffness of a unit or element in shear, expressed in pounds per square inch ($K_s$) is obtained by the following formula:

$$K_s = \frac{A}{T}(10)^{[1.25 + .015H]}$$

In these formulae, A equals the loaded area in compression in square inches. This is the cross-sectional area in a plane parallel to the bonded surfaces, i. e., the plates. This is the restrained or bonded area. T equals the thickness in inches of the rubber element in compression. H equals the figure equivalent to the hardness of the rubber to be used as found by the use of a durometer such for example as Shore's durometer. The letter $a$ equals the free or unbonded area in square inches of the rubber element under compression. We have now explained the basic and simple tools whereby desired spring rates may be designed into simple elements.

The formula for the $K_c$ compression in an axial direction, one of the three major dimensions, when applied to the compression element C, gives a numerical value which is part of the axial stiffness of the complete unit. The other part of the axial stiffness is the axial stiffness of the bushing S. This is in shear and therefore is ascertained by application of the formula for $K_s$. The numerical result of this application gives the axial stiffness of the bushing S. The sum of these two elemental axial stiffnesses, in view of the parts being arranged in parallel, is obtained by merely adding them. The resultant sum of these two figures gives the total stiffness of the whole isolator unit in the vertical direction.

The stiffnesses of the unit in two radial directions at the right angles to each other are obviously equal to each other in view of the circular nature of the unit and it will therefore be sufficient to ascertain the stiffness in any one radial direction. It will be seen that the stiffness of the shouldered tube unit shown in Figs. 1 and 2 in a radial direction is composed of the stiffness in compression of the bushing S, ascertained by use of the formula for $K_c$, and the stiffness in shear of the compression element C, ascertained by the use of the formula for $K_s$. As in the case of ascertaining the total stiffness of the unit in the axial direction, the summation of the stiffnesses of the two individual elements is attained by adding together the elemental stiffnesses because the two stiffnesses resist vibration in a parallel relation.

It will now be seen that in order to get the condition of equal stiffnesses in the radial and axial directions in the shouldered tube form of Figs. 1 and 2, the following condition must exist:

$K_s$ of bushing S + $K_c$ of compression element C = $K_c$ of bushing S + $K_s$ of compression element C As an illustration of the usefulness of the various formulas given above and of how they are applied to the designing of an actual isolator unit, let us assume that it is desired to design a non-directional unit of the general shape of the unit shown in Figs. 1, 2 and 16. While this integral unit obviously comprises the compression element C and the bushing S, working functionally in parallel, it may make the application of the basic compression and shear formulas given above more simple if the ascertainment of the dimensions of the elements of this combined form is followed through. The lines of demarcation between the bushing element S and the compression element C are shown by the dotted lines. For this unit, the loaded area in compression of the compression element will be seen to have a mean cross-sectional area in square inches:

$$A_c = \frac{\pi}{4}(D_c^2 - d_c^2)$$

where $D_c$ and $d_c$ are the mean outer and inner diameters of the compression element C in inches.

Similarly, the free or unbonded area of the element in square inches becomes:

$$a_c = \pi D_c T$$

where T is the thickness in inches. In this formula for the free area it will be noted that the area of the surface between the elements S and C is not considered as part of the free surface of the element C but it is considered a part of the free surface of the element S when figuring the spring stiffness of that element in compression. We now have the necessary details for defining stiffness of the compression element C.

The element S may be considered as a flat ended bushing of a length L equal to the mean length of the element S and having an outer diameter $D_b$ and an inner diameter $d_b$. In such a unit the axial stiffness or spring rate of the bushing S in shear may be found by calculus from the formula:

$$k_s = \frac{A}{T}(10)^{(1.25 + .015H)} \text{ to be } \frac{2.73 L (10)^{(1.25 + .015H)}}{\log_{10}\frac{(D_b)}{(d_b)}}$$

where L, $D_b$ and $d_b$ are the unit dimensions as shown in Fig. 16 and H is the hardness of the rubber compound as given by the Shore durometer.

The axial stiffness of the compression element C is given by the formula:

$$k_c = \frac{\pi(D_c^2 - d_c^2)(10)^{\left(1.82 + .015H + 0.52\frac{\pi(D_c^2 - d_c^2)}{4\pi D_c T}\right)}}{4T}$$

where $D_c$, $d_c$ and T are the dimensions as indicated in Fig. 16 and H is the durometer hardness of the rubber compound. The sum of these two stiffnesses should be substantially equalled by the sum of the radial stiffness of the bushing S and the shear stiffness of the compression element C in order that the unit may have non-directional properties, that is, have equal stiffness along each of three mutually perpendicular axes. The radial stiffness of the bushing is found from this formula:

$$k_c = \frac{2(D_b + d_b)L}{(D_b - d_b)}(10)^{\left(1.82 + .015H + \frac{.52(D_b + d_b)L}{2(D_b - d_b)\left[\frac{(D_b + d_b)}{2} + L\right]}\right)}$$

while the shear stiffness of the compression element C is found from the formula:

$$k_s = \frac{\pi(D_c^2 - d_c^2)}{4T}(10)^{(1.25 + .015H)}$$

where $D_b$, $d_b$, $D_c$, $d_c$, L and T are the dimensions as shown in Fig. 16 and H is the durometer hardness. These formulas provide means for determining the stiffness of the unit in terms of its dimensions or readily determinable quantities.

In designing the unit many of the quantities of the equations are determined by the conditions of application as for example where the unit is to have a spring rate (K) of 10,000 pounds per inch and a static deflection rating of 0.2 inch using elastic material having a durometer hardness (H) of 50. The central bolt of reasonable size could be 0.75 inch diameter indicating a central metal tube of 1 inch outsde diameter. This is the inner diameter $d_b$ of Fig. 16. The requirement of a static deflection rating of 0.2 inch with a reasonable overload factor of two requires that there be about an inch of rubber between the bonded surfaces of the bushing giving the outer diameter $D_b$ of the bushing as 3 inches and the thickness (T) as 1 inch. From these values and the formulae given the remaining dimensions can be readily determined. The condition of equality given above where the sum of the elemental axial stiffnesses equal the sum of the elemental radial stiffnesses by substitution of the specific dimensions or shapes of the shoulder tube form of unit becomes the following in the case of the unit of Figs. 1, 2 and 16:

$$\frac{2.73L(10)^{(1.25+.015H)}}{\log_{10}\frac{(D_b)}{(d_b)}} + \frac{\pi(D_c^2-d_c^2)(10)^{\left(1.82+.015H+\frac{0.52\pi(D_c^2-d_c^2)}{4\pi D_c T}\right)}}{4T} =$$

$$\frac{2(D_b+d_b)L}{(D_b-d_b)}(10)^{\left(1.82+.015H+\frac{.52(D_b+d_b)L}{2(D_b-d_b)\left[\frac{(D_b+d_b)}{2}+L\right]}\right)} + \frac{\pi(D_c^2-d_c^2)}{4T}10^{(1.25+.015H)}$$

In calculating the dimensions of an element of the unit shown in Figs. 3 and 4 it will be noted that the rubber between the legs of each annular member is completely enclosed and will exhibit negligible deflection under loads as compared with the deflection of the main rubber portion and, therefore, may be ignored. The rubber portion considered, therefore, is the annular rubber portion whose section lies between the lines $a$—$a$ and $b$—$b$ of Fig. 3. This annular rubber portion, as shown in Fig. 17 has a half-section of truncated conical shape, the rubber being tapered to provide surfaces at $a$—$a$ and $b$—$b$ of substantially the same cross sectional area to permit of efficiency in loading and to insure reasonable uniformity of stress throughout the main rubber portion. In Fig. 17, the line $x$—$x$ is the median line or axis of symmetry of the half-section, $\alpha$ the angle of inclination of the axis of symmetry with the axis of revolution R—R, D and $d$, the diameter of the element at the points of intersection of the axis of symmetry with the surfaces of the element, T the distance along the axis of symmetry between the surfaces of the element, $h$ the projected length of T on the axis of revolution, W the width of the wider surface and A the area of either surface.

If a load be applied to the element parallel to its axis of revolution, the rubber section will be compressed in the direction of the line X—X and sheared in a direction normal to that line. This action will take place all around the element uniformly. The axial stiffness $K_a$ will then be the sum of the components of the compressive and shear stiffness, denoted by $k_c$ and $k_s$, respectively, in the direction parallel to the axis. Stated mathematically $$K_a = K_c \cos^2\alpha + k_s \sin^2\alpha$$

If a load be applied laterally normal to the axis and, for example, in the plane of Fig. 17, the section will be compressed on one side parallel to the line X—X, stretched on the opposite side in a similar manner and sheared on both sides in a direction normal to X—X. If it be visualized that the line X—X represents the section of a cone, it will be seen that the above deformations occur to a maximum degree in the plane of Fig. 17 and decrease to zero in the sectional plane normal to that of Fig. 17. In addition, the section will be sheared sidewise or tangentially of the cone represented by X—X; this latter effect being at a maximum in a plane normal to that of Fig. 17 and decreasing to zero in the plane of Fig. 17. The effect of these variations in deformation is taken into account in the equation for the radial stiffness $K_r$ of the element which is again the sum of the components of the individual compressive and shear stiffnesses involved. The resultant of a stiffness acting either radially or tangentially around a circular section can be shown by means of calculus to equal exactly one-half of the total stiffness involved. Therefore, the stiffness of the element in a radial direction may be written $$K_r = \tfrac{1}{2}k_c \sin^2\alpha + \tfrac{1}{2}k_s \cos^2\alpha + \tfrac{1}{2}k_s$$

To write the equation for equal stiffness in all directions it is merely necessary to equate the equations for $K_a$ and $K_r$. To expand the equation for the stiffness fully in the terms of the elements dimensions and properties of the rubber we proceed as follows.

The general form of the equation for $k_c$ is:

$$k_c = \frac{A}{T}(10)^{\left(1.82+.015H+\frac{0.52A}{a}\right)} = \frac{\pi dw}{T}(10)^{\left(1.82+.015H+\frac{0.52\pi dw}{\pi T(D+d)}\right)}$$

while $$k_s = \frac{A}{T}(10)^{(1.25+.015H)} = \frac{\pi dw}{T}(10)^{(1.25+.015H)}$$

where H is the durometer hardness of the rubber and D, $d$, T and $w$ are the dimensions as given in Fig. 17.

It will also be noted that $$\cos^2\alpha = \frac{(h)^2}{(T)}$$

and $$\sin^2\alpha = \frac{(D-d)^2}{(2T)}$$

The complete statement of equality of axial and radial stiffness may now be written equating and expanding the equations for $K_a$ and $K_r$ as follows:

$$\left[\frac{\pi dw}{T}(10)^{\left(1.82+.015H+\frac{0.52dw}{T(D+d)}\right)}\right]\frac{(h)^2}{(T)} + \left[\frac{\pi dw}{T}(10)^{(1.25+.015H)}\right]\frac{(D-d)^2}{(2T)} =$$

$$\left[\frac{\pi dw}{2T}(10)^{\left(1.82+.015H+\frac{0.52dw}{T(D+d)}\right)}\right]\frac{(D-d)^2}{(2T)} + \left[\frac{\pi dw}{2T}(10)^{(1.25+.015H)}\right]\frac{(h)^2}{(T)} + \frac{\pi dw}{2T}(10)^{(1.25+.015H)}$$

In designing an element as shown in Figs. 3, 14 and 17, the dimension $d$ has to be sufficient for the passage of an attaching bolt of suitable size for the load and the dimension $w$ has to be chosen so as to give an area A ($=\pi dw$) of suitable size to carry the required loads without excessive stress. The dimension T is selected so as to permit the required deflection in the element without exceeding allowable percentage deformation as pointed out in connection with the unit of Figs. 1 and 2. From the equations given the stiffness of an element may be attached by adjustment of the values of T and $w$ and the final dimensions are obtained by solving the stiffness equality equation for $h$ and D which, it will be noted, have the relationship $$T^2 = h^2 + \left(\frac{D-d}{2}\right)^2$$

While, in discussing the derivation of the formulae for the stiffnesses of the rubber element reference is made to stiffnesses of the element in compression it is to be understood that such formulae apply to stiffnesses of the element in tension within the usual allowable limits of extension of the element.

Reference is made to the copending application of Philip C. Efromson and Robert C. Lewis, Ser. No. 666,476, filed May 1, 1946, now Patent No. 2,538,955, dated January 23, 1951, which discloses and claims a specific form of isolator coming within the scope of the present invention. Reference is also made to the copending application of Robert C. Lewis and Karl Unholtz, Ser. No. 730,080, filed February 21, 1947, which discloses and claims a suspension in which the isolators here disclosed and claimed may be used.

What is claimed is:

1. A vibration isolator unit having two oppositely disposed rigid members, in combination with resilient cushioning means facing the rigid members, the cushioning means in each of three mutually perpendicular directions lying between the rigid members and partly in shear orientation and partly in compression or tension relation, the sum of the stiffnesses of the rubber in the different orientations in one of those three directions being equal to the sum of the stiffnesses in each of the other directions, whereby the unit has substantially equal spring rates in all directions.

2. A vibration isolator mount according to claim 1 in which the resilient cushioning member is bonded to the two rigid members.

3. A vibration isolator unit of circular nature according to claim 1 in which the resilient cushioning means lying between the rigid members extends laterally further from the axis of the unit at one end of the unit than at the other end, whereby the unit is substantially non-directional.

4. A vibration isolator unit having two oppositely disposed rigid circular members and a resilient cushioning means, each of said rigid members having in cross-section two faces perpendicular to each other and each parallel to a face of the other member, one face of each member being opposed, at least in part, to a face of the other member; the resilient cushioning means lying between the opposing faces partly in shear orientation and partly in compression or tension orientation, the sum of the stiffnesses of the rubber in the different orientations in one of three mutually perpendicular directions in the unit being equal to the sum of the stiffnesses in each of the other directions, whereby the unit has substantially equal spring rates in all directions.

5. A vibration isolator unit comprising two oppositely disposed rigid members and a resilient cushioning means, each of said rigid members having two faces perpendicular to each other and each parallel to a face of the other member, one face of each member being opposed, at least in part, to a face of the other member; the resilient means in the axial direction of the unit and in two directions mutually perpendicular thereto lying between the faces of the two rigid members partly in shear orientation and partly in compression orientation, the area of the resilient means in shear orientation in any one of those directions being so proportioned to the thickness of the rubber in the compression orientation in that direction that the sum of the stiffnesses of the rubber in the shear and compression orientations in that direction is equal to the sum of the stiffnesses of the rubber in the orientations in each of the other two directions, whereby the unit is substantially non-directional.

6. A vibration isolator unit according to claim 1 in which the unit is circular in nature, the shape and position of the resilient cushioning means being a tapered hollow body of revolution drawn about the axis of the unit; said means engaging the rigid members at points at one end of the tapered body which are different distances from the axis of the unit than the points of engagement at the other end of the tapered body.

7. A vibration isolator unit having two rigid members in combination with a rubber cushioning member engaged therebetween comprising in each of three mutually perpendicular directions portions in shear orientation and portions in compression or tension orientation, said portions in each of said directions jointly supporting the load in parallel, the total stiffness of the unit in any of said three mutually perpendicular directions expressed in pounds per inch, equalling the total stiffness in any other of those directions, the total stiffness in any one direction being the sum of the stiffnesses of the portions loaded in shear and the portions otherwise loaded, the stiffness of each portion being found by dividing the loaded area in square inches by the thickness of the rubber element in inches, multiplying the result by 10 raised by a power which, when the stiffness is other than shear, is composed of 1.82 plus .015 times the quality of the rubber to be used, expressed in durometer hardness, plus 0.52 times the loaded area divided by the unloaded area each expressed in square inches; and when the stiffness is shear, the power by which 10 is raised is composed of 1.25 plus .015 times the quality of the rubber to be used, expressed in durometer hardness.

8. A vibration isolator unit comprising inner and outer tube members with right angle flanges and therebetween and integral rubber cushioning member having a tubular bushing portion and an annular portion of greater outside diameter than said bushing portion and attached at an end of said bushing portion, the sum of the stiffness of the said portion in the direction of the tube axis being given by the formula $$\frac{2.73 L (10)^{(1.25+.015H)}}{\log_{10}\frac{(D_b)}{(d_b)}} + \frac{\pi(D_c^2 - d_c^2)}{4T}(10)^{\left[1.82+.015H+\frac{0.52\pi(D_c^2+d_c^2)}{4\pi D_c T}\right]}$$

where L is the mean length of the rubber of the bushing, $D_b$ and $d_b$ are the outer and inner diameters of the bushing, respectively, T is the thickness of the rubber of the annular portion, $D_c$ and $d_c$ are the mean outer and inner diameters, respectively, of the annular portion and H is the durometer hardness of the rubber compound used and said bushing and annular portions are considered as having a common conical surface forming a free surface for the bushing when the bushing is compressed radially and a neutral surface for the annular portion when the annular portion is compressed axially whereby the unit is non-directional and the spring rates linear.

9. A vibration isolator unit of circular nature comprising inner and outer tube members with right angle flanges and resilient cushioning means bonded thereto between both the tubular and flange portions of said members, thus giving a combined tubular and sandwich mount, said members being concentric about a major axis of the unit, the total of the high stiffness in compression of the part of the cushioning means located in the flange portion, plus the low stiffness in shear of the part of the cushioning means located in the tubular portion, which stiffnesses together are positioned to move under an axial load, being equal to the total of the stiffness in shear of the part of the cushioning means in the flange portion and the stiffness in compression of the part of the cushioning means in the tubular portion in each of the two directions mutually perpendicular to the axis, whereby the unit is substantially non-directional.

10. A vibration isolator unit of circular nature comprising two annular, oppositely disposed, rigid members and resilient cushioning means therebetween, these means being a truncated hollow cone in shape and facing the two rigid members at the cone angle, the thickness and angle of the cone being such that the combined shear and compression stiffnesses of the unit in the axial direction of the unit are equal to the combined shear and compression stiffnesses in each of the two directions mutually perpendicular to each other and the axis of unit, whereby the unit is non-directional and its spring rates linear in character.

11. A vibration isolator unit comprising a hollow rubber body formed as a body of revolution one end of which is of greater diameter than the other and which has rubber radially outside the rubber at the other end in combination with spaced annular angle members engaging opposite ends of said rubber body, said rubber body having effective axial spring stiffness as expressed by the formula $$K_a = \left[\frac{\pi dw}{T}(10)^{\left(1.82+.015H+\frac{0.52dw}{T(D+d)}\right)}\right]\frac{h^2}{T} + \left[\frac{\pi dw}{T}(10)^{(1.25+.015H)}\right]\frac{(D-d)^2}{(2T)}$$

substantially equals the radial spring stiffness of the body as expressed by the formula $$K_r = \left[\frac{\pi dw}{2T}(10)^{\left(1.82+.015H+\frac{0.52dw}{T(D+d)}\right)}\right]\frac{(D-d)^2}{(2T)} + \left[\frac{\pi dw}{2T}(10)^{(1.25+.015H)}\right]\frac{(h)^2}{(T)} + \frac{\pi dw}{2T}(10)^{(1.25+.015H)}$$

where D and $d$ are the diameters of the circles through the ends of the median lines of the effective rubber body of revolution included between the annular members, $w$ is the effective width at the diameter $d$ of the rubber body of revolution in a plane perpendicular to the median line, T is the effective length of the rubber body of revolution between the annular members, $h$ is the length of the projection of T on the axis of revolution and H is the Shore durometer hardness of the rubber compound.

12. A vibration isolator unit according to claim 1 in which the resilient cushioning means is a continuous ring.

PHILIP C. EFROMSON.
JOHN A. DICKIE.
ROBERT C. LEWIS.

REFERENCES CITED

The following references are of record in the file of this patent:

UNITED STATES PATENTS

| Number | Name | Date |
|---|---|---|
| 2,367,697 | Stitz et al. | Jan. 23, 1945 |
| 2,401,449 | Yates | June 4, 1946 |

FOREIGN PATENTS

| Number | Country | Date |
|---|---|---|
| 210,639 | Switzerland | Oct. 1, 1940 |
| 548,149 | Great Britain | Sept. 28, 1942 |

OTHER REFERENCES

Publication—The Rubber Age of August 25, 1931 (Copy in Div. 52).